United States Patent [19]

Donaldson et al.

[11] 4,282,339

[45] Aug. 4, 1981

[54] DUAL REACTOR PROCESS AND APPARATUS FOR POLYMERIZING ETHYLENE

[75] Inventors: Charles R. Donaldson; Claude J. Stiles, both of Cincinnati, Ohio

[73] Assignee: National Distillers and Chemical Corp., New York, N.Y.

[21] Appl. No.: 104,609

[22] Filed: Dec. 17, 1979

Related U.S. Application Data

[62] Division of Ser. No. 947,801, Oct. 2, 1978, Pat. No. 4,229,416.

[51] Int. Cl.³ .................... C08F 2/34; C08F 4/28; C08F 10/02
[52] U.S. Cl. ........................... 526/64; 526/65; 526/68; 528/503
[58] Field of Search .................. 526/65, 64

[56] References Cited

U.S. PATENT DOCUMENTS

| 3,875,128 | 4/1975 | Suzuki et al. | 526/65 |
| 3,875,134 | 4/1975 | Morikawa et al. | 526/352.2 |
| 4,085,266 | 4/1978 | Nakai et al. | 526/65 |
| 4,123,600 | 10/1978 | Kita et al. | 526/65 |

Primary Examiner—Edward J. Smith
Attorney, Agent, or Firm—Kenneth D. Tremain

[57] ABSTRACT

Ethylene is polymerized in a dual reactor system in which two reactors are connected in series with a heat exchanger, or intercooler, disposed therebetween. The reaction stream from the first reactor at elevated pressure and temperature is passed through the heat exchanger to effect cooling of the stream. Following passage through the heat exchanger, the pressure of the cooled reaction stream is reduced through a pressure let-down valve and the stream is thereafter introduced into the second reactor wherein further polymerization takes place. The reactors can both be of the autoclave type although one of the reactors can be of the tubular variety.

8 Claims, 1 Drawing Figure

DUAL REACTOR PROCESS AND APPARATUS FOR POLYMERIZING ETHYLENE

This is a division of application Ser. No. 947,801, filed Oct. 2, 1978 now U.S. Pat. No. 4,229,416.

BACKGROUND OF THE INVENTION

1. Field of the Invention

This invention relates to the field of processes and apparatus for the high pressure polymerization of ethylene alone or together with minor amounts of one or more other copolymerizable monomers to form polyethylene homopolymers and copolymers, respectively. As used herein, the terms "polyethylene", "ethylene polymer" and terms of like import shall be understood to include homopolymers and copolymers of ethylene.

2. Description of the Prior Art

Various proposals have heretofore been made for the continuous high pressure polymerization of ethylene in a series of reactors, either with the object of improving overall conversion efficiency and/or to provide polymers having certain desirable properties.

U.K. Pat. No. 765,501 describes the polymerization of ethylenically unsaturated monomers, including ethylene, at elevated pressure and temperature in the presence of free radical catalysts in a series of reactors. Thus, for example, ethylene is polymerized in the first reactor to convert from 10 to 25% of the initial ethylene feed to polyethylene. The effluent from the first reactor is then deactivated such as by cooling in a heat exchanger. In the deactivated state, additional catalyst is added to the reaction mass, the reaction mass is reheated to effect its reactivation and the reactivated reaction mass is then introduced into the second reactor to accomplish further conversion of monomer. The sequence of deactivation, catalyst addition, reactivation and polymerization is repeated for the remaining reactors in the series until the desired amount of conversion of ethylene to polyethylene is attained. The polyethylene produced in each reactor can be recovered separately therefrom or the polymer can be totally collected following the final stage of reaction.

U.S. Pat. No. 2,964,514 to Fawcett describes a process for polymerizing olefins such as ethylene in a series of autoclave reactors having a heat exchanger positioned between pairs of reactors. Effluent from the first reactor at a temperature of about 140° C. is passed through the cooler and exits therefrom at about 110° C. precipatating the polymer. The reaction stream, now in the form of a slurry containing ethylene polymer and unreacted ethylene monomer, is introduced into the second reactor wherein further polymerization takes place.

U.S. Pat. No. 3,380,978 to Ryan et al. relates to the preparation of polyolefins such as polyethylene in a series of reactors, the first of which is a short holdup tubular reactor and the second of which is a longer holdup constant environment autoclave reactor. Control of polymer properties is achieved principally by imposing limitations on the tubular and autoclave reactor temperatures and pressures, reactant feed temperature, catalyst concentration, point of catalyst entry, contact times and composition of monomer feed.

U.S. Pat. No. 3,875,128 to Suzuki et al. describes a process and apparatus for polymerizing ethylene in a battery of autoclave reactors connected by means of piping to a heat exchanger disposed between the reactors. The pressure of the reaction effluent from the first reactor is reduced through a let-down valve and the reduced pressure reaction stream is passed through the cooler to reduce the temperature of the stream to above 120° C. but lower than the reaction temperature in the first reactor by at least 20° C. The cooled reaction stream is then introduced into the second reactor to continue the polymerization reaction. In the similar process and apparatus for polymerizing ethylene shown in U.S. Pat. No. 3,875,134, ethylene is first polymerized in an autoclave reactor, and after passage through a pressure let-down valve and a heat exchanger, the reaction stream is introduced into a tubular reactor for completion of the polymerization reaction.

While it has been observed that cooling the reaction medium passing from one reactor to another in a series of ethylene high pressure polymerization reactors leads to significantly greater levels of monomer conversion, the reduction in pressure of the reaction stream from the first, or preceding, reactor prior to passage of the stream through a heat exchanger as in the processes and apparatus of U.S. Pat. Nos. 3,875,128 and 3,875,134 tends to result in phase separation, or precipitation, of the polyethylene from the reaction stream with consequent fouling or plugging of the heat exchanger. The increased maintenance and reactor down-time imposed by the need to periodically clear the heat exchanger of accumulated ethylene polymer constitutes a significant practical and economic disadvantage for reactor systems operating in the aforesaid manner. There has thus existed a need for an ethylene polymerization process and apparatus which benefits from the high conversion rates characteristic of multiple reactor systems, but which is far less susceptible to problems of polymer phase separation and heat exchanger fouling than the multiple reactors heretofore proposed or used.

SUMMARY OF THE INVENTION

In accordance with the present invention, ethylene is polymerized or copolymerized with one or more other ethylenically unsaturated monomers in a dual reactor system provided with an intercooler at high pressure and elevated temperature employing such known and conventional catalysts as are known to be useful for ethylene polymerization. The reaction stream from the first reactor containing dissolved polyethylene and unreacted monomer is passed through the heat exchanger at the relatively high velocity imparted by the highly elevated pressure which exists in the first reactor. It is generally preferred to conduct polymerization in the second reactor at at least about 120° C., said minimum temperature being at least about 30° C. greater than the reaction temperature of the first reactor. After passage through the intercooler, the pressure of the cooled reaction stream is reduced prior to being introduced in the second reactor where polymerization is completed. The higher reactor pressure results in greater solubility of polyethylene in the reaction stream which counteracts the tendency of the polymer to precipitate out of solution and become deposited upon the walls of the intercooler. Therefore, by relieving the pressure of the reaction stream only after it has completed its passage through the cooler, the ethylene polymerization system herein avoids troublesome polymer phase separation, reduces the frequency with which the reactors must be shut down for maintenance and repair and promotes sustained operation.

The reactors herein can both be of the autoclave type, many versions of which are known and conventional. In general, autoclave reactors have a relatively large diameter, the ratio of the length to the diameter commonly being on the order of 5 to 20:1, and are provided with stirrers. Alternatively, one of the reactors, be it the first or second in the series, can be of the well known tubular type in which case the length to diameter ratio of the reactor will vary from 200 to 100,000:1. This invention contemplates the use of conventional heat exchange, or intercooler, units, the cooling capability of which will be determined by factors which are well known and readily calculable for a given polymerization procedure by those skilled in the art. Similarly, the pressure let-down valve for use in the apparatus herein can be of standard and well known construction.

The conditions for conducting polymerization of ethylene in autoclave and tubular reactors are well established. In general, polymerization is carried out at a pressure of from about 5,000 to about 50,000 psi for autoclave reactors and up to 100,000 psi or even higher for tubular reactors. The temperature levels selected are typically within the range of from about 120° C. to about 300° C. While no particular criticality attaches to the specific reaction pressures and temperatures herein, these parameters will be selected so as to maximize overall conversion rates without, however, causing significant phase separation of polyethylene contained in the reaction stream flowing between the reactors. In accordance with established procedures, the optimum pressure and temperature for polymerization in the first reactor for a particular polymerization run can be calculated by observing the tendency for phase separation in a number of test runs carried out at different pressures and temperatures.

DESCRIPTION OF THE PREFERRED EMBODIMENTS

Figure 1:
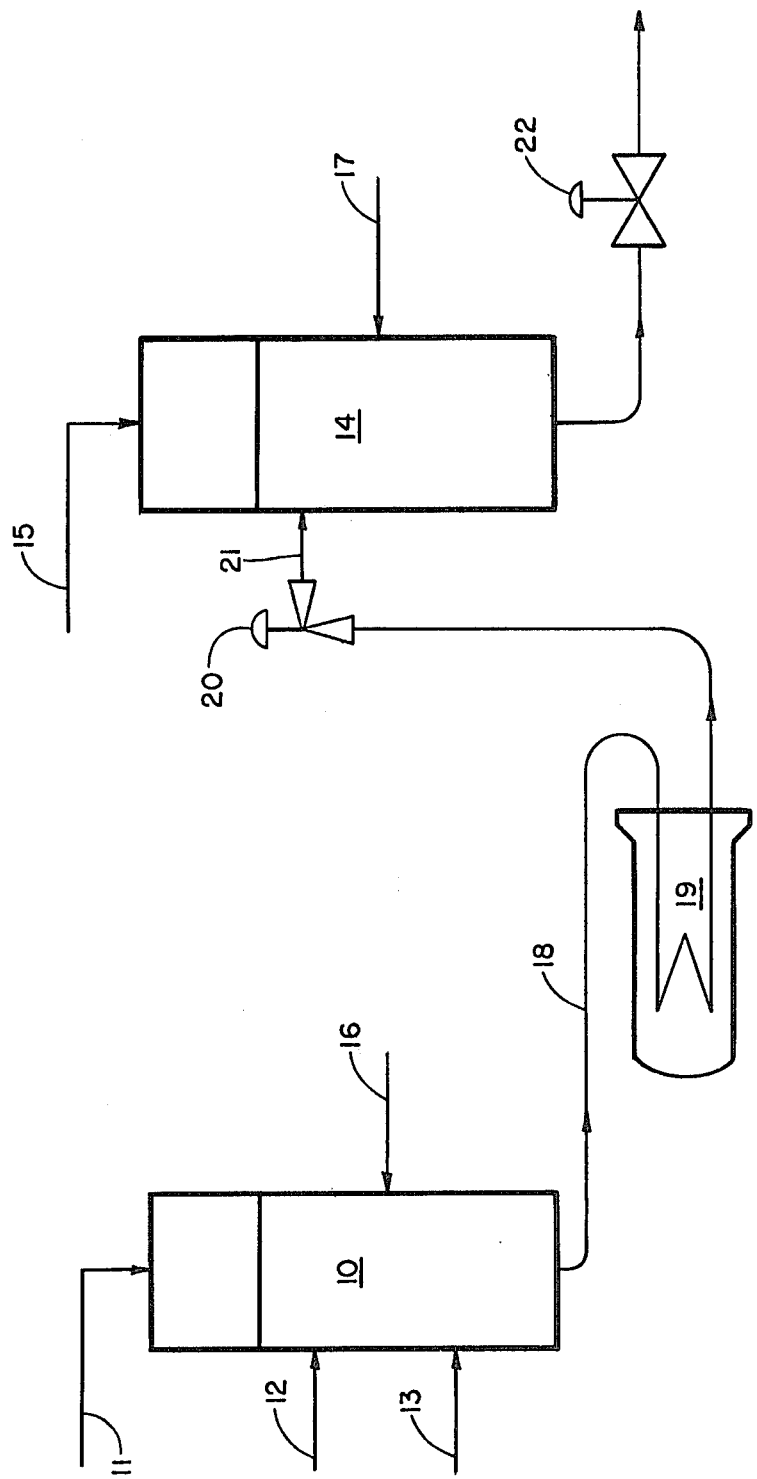

In accordance with the simplified flow diagram of FIG. 1 which is illustrative of the polymerization process and dual reactor apparatus herein, ethylene gas at a temperature of about 60° C. is introduced in the primary, or high pressure, autoclave reactor 10 at 11, 12 and 13, and into the secondary, or low pressure, autoclave reactor 14 at 15. Reactor 10 has a capacity of about 5 liters and reactor 15 has a somewhat larger capacity. Catalyst is introduced into reactor 10 at 16 and into reactor 14 at 17. Polymerization is carried out in reactor 10 at from about 25,000 psi to about 40,000 psi and a temperature of from about 200° C. to about 300° C., and preferably at a pressure of from about 28,000 psi to about 35,000 psi and a temperature of from about 225° C. to about 250° C. The reaction stream from reactor 10 containing from about 10% to about 15% dissolved polyethylene in unreacted ethylene monomer flows through conduit 18 which passes through intercooler 19. Intercooler 19 consists of three separate 20 foot coils of 9/16×3/16 inch stainless steel tubing, each of which enter and exit through a single head. Two short "U" tubes connect the three coils in series for use in the dual reactor polymerization. This arrangement gives a heat transfer coefficient range of about 35 to about 45 BTU's/ft$^2$°F. A suitable heat exchange medium which for reasons of economy is usually water flows through intercooler 19 at such a rate as to produce a desired change in temperature of the reaction stream, e.g., from an entry temperature of about 260° C. to an exit temperature of about 190° C. Following passage through the intercooler, the cooled reaction stream passes through pressure let-down valve 20 reducing the pressure of the stream to a level from about 20,000 psi to about 22,000 psi. The reaction stream at reduced temperature and pressure is then introduced into the low pressure reactor 14 wherein further polymerization is carried out. Reaction effluent from reactor 14 is passed through pressure let-down valve 22 and thereafter to a conventional product separator (not shown) for recovery of the polyethylene and unreacted monomer.

By reducing the pressure of the reaction stream only after the stream has been passed through the intercooler, no more than about 1% polyethylene will precipitate from solution compared to about 35% precipitation which has been observed to occur under the conditions given in Example 1 of U.S. Pat. No. 3,875,128 to Suzuki.

Similar results can be obtained in accordance with this invention employing an autoclave reactor in series with a tubular reactor.

The table below sets forth the operational data for an ethylene polymerization run employing the aforedescribed apparatus.

TABLE

|  | High Pressure Reactor | Low Pressure Reactor |
|---|---|---|
| Catalyst Rate*, pph | 0.0137 | 0.0031 |
| Catalyst Carrier; light kerosene | | |
| Catalyst Carrier Rate, pph | 2.73 | 0.62 |
| Modifier Used; cyclohexane | | |
| Modifier Rate, pph | 6.4 | |
| Medium on Cooler | Water | |
| Cooling Medium Rate: lbs/hr | 960 | |
| Cooling Medium Temp., °C.; in | 30 | |
| Cooling Medium Temp., °C.; out | 50 | |
| Ethylene Make-up Rate, pph | 258 | |
| Polymer Make Rate, pph | 90 | |
| Catalyst Efficiency, lb Polymer/lb Cat. | 5357 | |
| Reaction Pressure, psi | 30,000 | 22,000 |
| Avg. Feed Gas Temp., °C. | 60 | 190 |
| Avg. Reaction Temperatures, °C. (Max.) | 260 | 275 |
| Level 1 | 140 | 255 |
| Level 2 | 167 | 270 |
| Level 3 | 201 | 265 |
| Level 4 | 242 | 272 |
| Level 5 | 242 | 275 |
| Level 6 | 260 | 275 |
| Melt Index | | 1.77 |
| Density | | 0.9223 |
| Haze, % | | 6.5 |
| Gloss, % | | 9.3 |
| Film Appearance | | 8C/10D |
| Tensile, MD/TD | | 2710/2340 |
| Yield, MD/TD | | NP/1680 |
| Elongation, MD/TD | | 245/400 |
| Modulus, MD/TD | | 32000/34000 |
| % Extractibles | | 1.18 |

*Catalyst is tertiary butyl perbenzoate

The catalysts which can be used in the ethylene polymerization process either individually or in combination include oxygen, inorganic peroxides, organic peroxides, oximes, azines and azo compounds. Examples of useful catalysts include hydrogen peroxide, di-t-butyl peroxide, diethyl peroxide, tert-butyl peroxide, t-butyl peracetate, methylethyl ketone peroxide, t-butyl hydroperoxide, acetyl peroxide, benzoyl peroxide, dioctanoyl peroxide, diisopropylperoxydicarbonate, succinic acid peroxide; oximes such as acetone oxime and the like; azines such as benzylidene azine and the like and azo compounds such as azobis (isobutyronitrile), 2,2'-azobis (methylisobutylate) and azobis (isobutylamide). The amount of catalyst which can be used can vary from 5 to 3000 parts by weight of the total reaction medium in the first reactor and from about 5 to 2000 parts by weight of the total reaction medium in the second reactor.

If desired, the ethylene can be polymerized in the presence of conventional modifiers to regulate the properties, e.g., molecular weight distribution of the resulting polymer. In addition, minor amounts, i.e., up to about 20 parts, of the monomer can be made up of one or more ethylenically unsaturated monomers including alpha-olefins such as propylene and butylene; vinyl esters such as vinyl acetate, vinyl formate and vinyl butyrate; acrylates and alkylacrylates such as methyl acrylate, ethyl acrylate, methyl methacrylate, and ethyl methacrylate; acrylamides and alkylacrylamides such as methyl acrylamide, ethyl acrylamide, methyl methacrylamide and ethyl methacrylamide; vinyl ethers such as methyl vinyl ether and t-butyl vinyl ether; vinyl ketones such as methyl vinyl ketone; dicarbonates such as diethyl fumarate and diethyl maleate; acid anhydrides such as maleic anhydride; and, styrene.

What is claimed is:

1. A process for polymerizing ethylene in a dual reactor system which comprises reacting ethylene in the presence of a catalyst at elevated pressure and temperature in a first reactor to provide a high pressure reaction stream containing dissolved polyethylene and unreacted ethylene, passing the high pressure reaction stream through an intercooler, prior to a reduction in pressure of said high pressure reaction stream, to effect cooling of the reaction stream, reducing the pressure of the cooled reaction stream, and introducing the cooled, reduced pressure reaction stream into a second reactor to effect further polymerization.

2. The process of claim 1 wherein the pressure and temperature of the reaction stream entering the intercooler, and the reduction in temperature of the reaction stream effected by passage of the stream through the intercooler are such that no more than about 1% polyethylene present in the reaction stream will precipitate therefrom.

3. The process of claim 2 wherein the pressure in the first reactor is from about 20,000 to 40,000 and the temperature in the first reaction is from 225° to 250° C.

4. The process of claim 1 wherein the catalyst is oxygen and/or an organic peroxide.

5. The process of claim 1 wherein a modifier is added to either or both reactors to regulate the molecular weight distribution of the polymer.

6. The process of claim 1 wherein ethylene is copolymerized with at least one other ethylenically unsaturated monomer.

7. The process of claim 1 wherein both reactors are of the autoclave type.

8. The process of claim 1 wherein the first or second reactor is of the tubular type.

* * * * *